June 10, 1924.
A. D. MacLELLAN
1,496,992
MIXING APPARATUS
Filed July 10, 1923      2 Sheets-Sheet 1
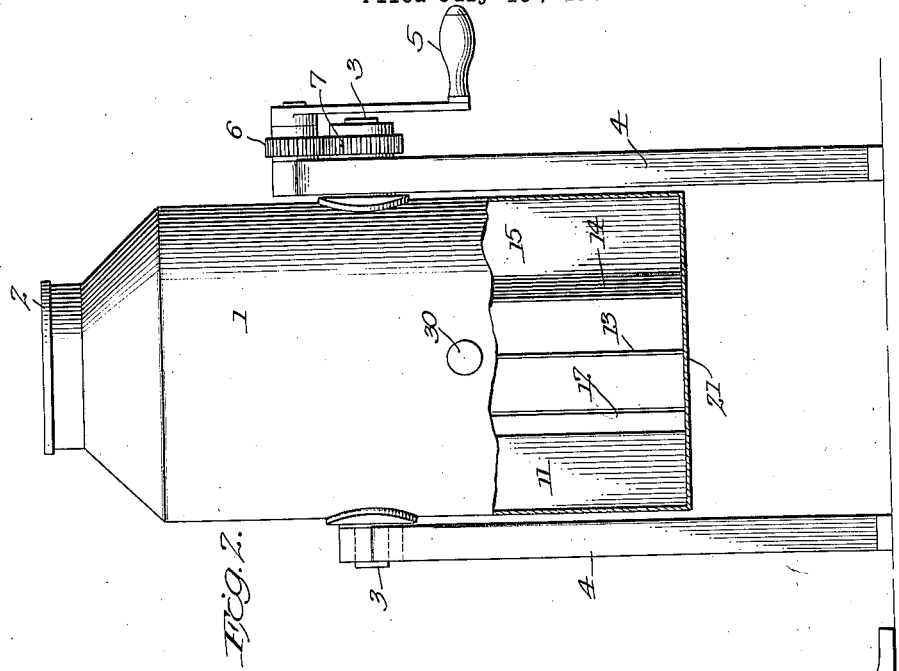
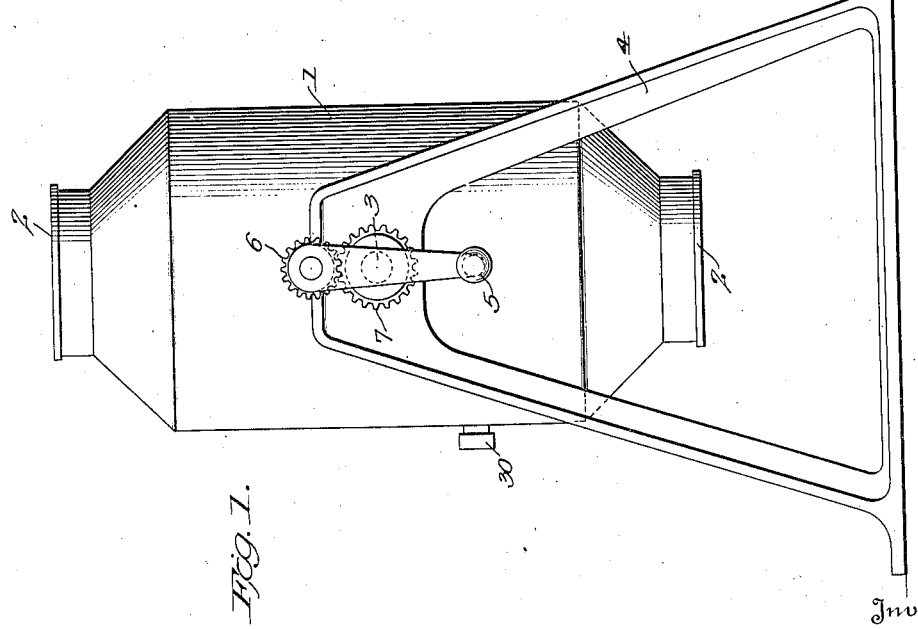
Inventor
Angus D MacLellan.
By Cushman, Byard Darly
Attorneys June 10, 1924.

A. D. MacLELLAN

MIXING APPARATUS

Filed July 10, 1923

Inventor

Angus D. MacLellan

By [signature]

Attorneys

Patented June 10, 1924.

1,496,992

UNITED STATES PATENT OFFICE.

ANGUS D. MacLELLAN, OF OWENSBORO, KENTUCKY.

MIXING APPARATUS.

Application filed July 10, 1923. Serial No. 650,655.

*To all whom it may concern:*

Be it known that I, ANGUS D. MACLELLAN, a citizen of the United States, residing at Owensboro, in the county of Daviess and State of Kentucky, have invented new and useful Improvements in Mixing Apparatus, of which the following is a specification.

The present invention relates to improvements in mixing apparatus adapted to mix freely running liquids or dry substances.

In particular the embodiment of the invention hereinafter described has been found well adapted for mixing food stuffs, stock feeds, poultry feed, etc.

By using the apparatus hereinafter described, a very intimate, perfect and thorough mixture of two or more materials of varying proportions and varying weight may be obtained in a minimum amount of time.

In the drawings:

Figure 1 is a side elevation of an apparatus embodying the invention.

Figure 2 is a front elevation illustrating a slightly modified form of container.

Figure 3:
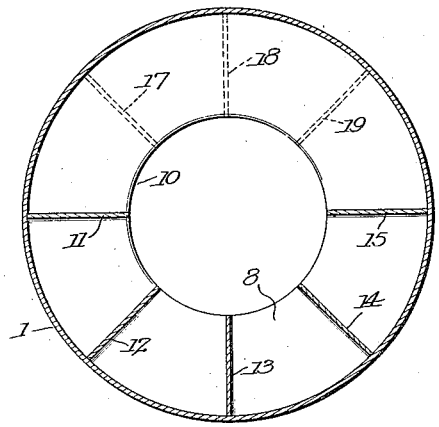
Figure 3 is a transverse sectional view substantially on the line 3—3 of Figure 5.

It will be understood that there can be considerable modification of the particular details illustrated without departing from the invention, and that the illustration is more or less conventional in part.

Except where the details are specifically set forth in the appended claims, it is not intended to limit the invention to the exact embodiment illustrated.

Referring to the drawings, the apparatus includes a main casing or container 1 which is of cylindrical form in cross section and relatively elongated. In the embodiment of the invention illustrated in Figures 1 and 5, the casing is provided with two open ends, which as shown, are closed by removable plug-like covers 2, although any other suitable form of closure may be employed.

At points midway of its length, the receptacle is provided with diametrically opposite laterally projecting trunnions 3 mounted in suitable bearings carried by frames or uprights 4 so that the casing or container may be rotated about a horizontal, transverse axis.

If desired, suitable means may be provided for positively rotating the container 1 in the manner described. Such a means is illustrated in Figures 1 and 2 comprising a handle 5 adapted to rotate a pinion 6 that meshes with a gear 7 secured to one of the supporting trunnions 3. By this means the casing may be rotated about the axis of the trunnions and contents thereof caused to travel from end to end of the casing.

Interiorly the container is divided into two compartments by a transverse partition having oppositely diverging cylindrical wall portions 8, 9, providing a central opening or passage 10 at the inner ends of the two compartments, and through which the contents of the casing may pass from one compartment to the other.

Figure 5:
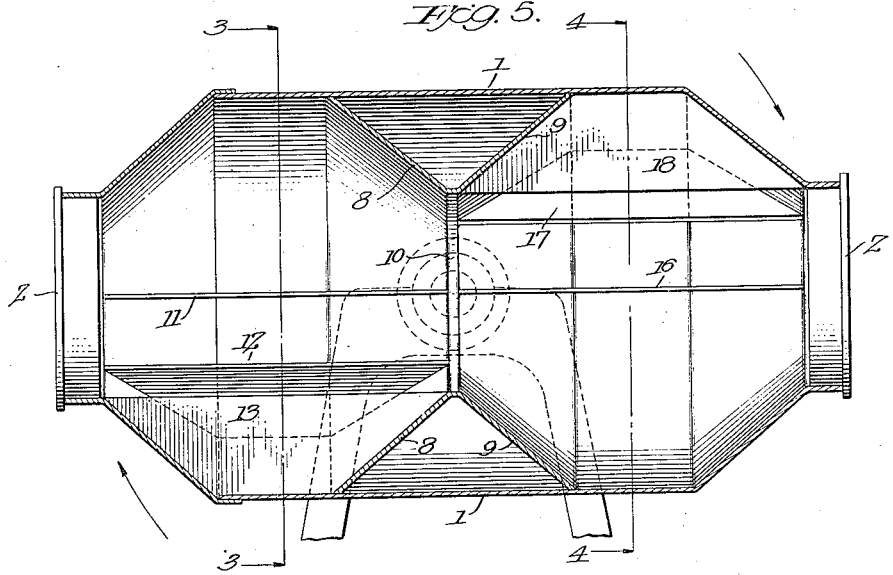
Figure 5 is a longitudinal central section through the embodiment of the invention illustrated in Figure 1.

In the embodiment of the invention shown in Figures 1 and 5, the walls of the casing or container 1 are tapered toward both end openings, and thus each of the compartments within the casing has oppositely tapering end portions.

The partition separating the two compartments within the container may be formed otherwise than as specifically illustrated and above described, it merely being necessary that the passage or opening through which the two compartments communicate be relatively restricted or of less cross sectional area than the body of each compartment.

Within each compartment of the container are arranged a series of partition plates which extend throughout the length of the compartment and project laterally inward from a portion of the peripheral wall thereof. The partitions in each compartment extend over only one-half of the peripheral area, and, as shown, those in one compartment are arranged at the opposite side of a longitudinal central plane through the container from those in the other compartment. That is, the partitions 11, 12, 13, 14 and 15 in the one compartment are arranged below the central horizontal plane of the container when the latter is positioned horizontally, as shown in Figure 5, while the corresponding partitions or plates in the other compartment are all arranged above said horizontal plane, as indicated at 16, 17, 18, 19 and 20.

The longitudinally extending plates or partitions in the compartments form a plurality of peripheral pockets, and as the container is rotated about the axis of its supporting trunnions, the contents of these pockets in one compartment will be successively discharged through the central opening 10 into the other compartment onto the portion of the peripheral wall of the latter compartment which is not provided with the pockets. As the rotation continues the material will be collected in the downwardly moving pockets, and as these successively rise above the horizontal, axial plane of the trunnions, the pockets will discharge into the other compartment through the opening 10.

Figure 4:
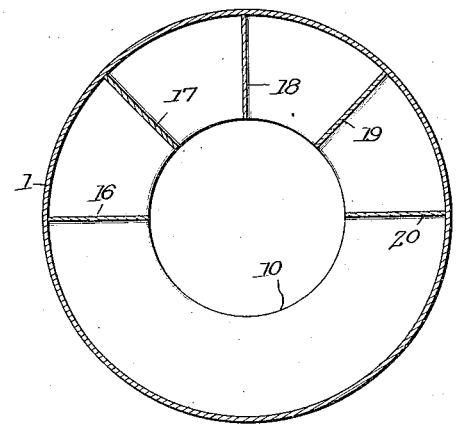
Figure 4 is a similar view substantially on the line 4—4 of Figure 5.

Referring to Figures 3, 4 and 5, it will be seen that as the container is rotated from left to right or in the direction of the arrows, assuming that the material to be mixed has been initially deposited in the left-hand compartment (Figure 5) the materials or portions of material resting on the substantially horizontal partition plates 11, 15 will be first discharged through the opening 10, and thereafter successively the portions of material contained in the pockets between the partitions 11, 12 and 15, 14 and between the partitions 14, 13, and 12, 13.

The effect of this is to deposit the materials in layers on the relatively smooth peripheral surface of the compartment receiving it, and as the container rotates, this mass of layered material is sub-divided by being received in the several pockets of said compartments, and these in turn are successively emptied through the opening 10 into the other compartment by rotation of the container. As the material falls from the several pockets, it tends to spread laterally in flowing through the opening 10, and practical experience has shown that by the arrangement of parts described, a very intimate and thorough mixture of different materials may be quickly effected.

A device embodying the invention has been found to be very useful in preparing self-rising flour or mixing bleaching ingredients into flour, wherein one pound of a suitable bleaching compound, for example, is to be intimately mixed with say two hundred pounds of flour.

Also the apparatus will effectively produce an intimate, thorough mixture of materials of different weights, as for example bran, weighing 20 pounds to a measured bushel, with corn meal, weighing 50 pounds to a measured bushel.

It may also be employed for preparing mixtures of other dry substances, as tea, coffee, nuts, etc., or freely flowing liquids, to provide insecticide sprays for example. For the latter purpose the casing is preferably provided with a lateral, normally closed outlet 30, through which the liquid contents may be withdrawn by a suitable pump.

The action of alternately collecting the different materials in the pockets in one compartment and successively discharging the same onto the smooth surface peripheral wall of the other compartment, collecting the mixed materials in the last said compartment and discharging them through a central opening into the other compartment, rapidly mixes all of the different materials to produce a uniform mixture.

Instead of making the main casing or container of the form shown in Figures 1 and 5 with openings at both ends, the form of container shown in Figure 2 may be used. In this embodiment of the invention, the container is open at one end only, and the other end is closed by a solid bottom 21.

Having thus described the invention, what is claimed is:

1. An apparatus for the purpose described comprising an elongated container open at one end and interiorly divided into two compartments by an imperforate transverse partition surrounding an opening connecting said compartments, a closure for the open end of the container, and means for supporting the container to rotate about a horizontal, transverse, axis.

2. An apparatus for the purpose described, comprising an elongated container open at one end and interiorly divided into two compartments by an imperforate transverse partition surrounding an opening connecting said compartments, a closure for the open end of the container, and diametrically opposite lateral trunnions projecting laterally from the body of the container.

3. An apparatus for the purpose described comprising an elongated container open at one end and interiorly divided into two compartments which communicate at their inner ends through a passage of less cross sectional area than the bodies of the compartments, a closure for the open end of the container, and means for supporting the container to rotate about a horizontal, transverse, axis.

4. An apparatus for the purpose described comprising an elongated container open at one end and interiorly divided into two compartments by a transverse partition provided with an opening connecting said compartments, the side walls of both compartments flaring outward in opposite directions from said opening, a closure for the open end of the container, and means for supporting the container to rotate about a horizontal, transverse, axis.

5. An apparatus for the purpose described comprising an elongated container open at one end and interiorly divided into two compartments which are gradually reduced in diameter toward their inner ends and communicate at such inner ends, a closure for the open end of the casing, and means for supporting the container to rotate about a horizontal, transverse, axis.

6. An apparatus for the purpose described comprising an elongated container open at one end and interiorly divided into two compartments by a transverse partition comprising oppositely diverging imperforate sections surrounding an opening which connects the compartments, a closure for the open end of the container, and diametrically opposite trunnions extending laterally from the container in the plane of the opening through the partition.

7. An apparatus for the purpose described comprising an elongated container open at one end and interiorly divided into two compartments communicating at their inner ends, a plurality of peripheral pockets being formed within one of the compartments, a closure for said open end, and means for supporting the container to rotate about a horizontal, transverse, axis.

8. An apparatus for the purpose described comprising an elongated container open at one end and interiorly divided into two compartments communicating at their inner ends, a series of partition plates extending radially inward from the peripheral wall of one of the compartments and throughout the length of said compartment, a closure for said open end, and means for supporting the container to rotate about a horizontal, transverse, axis.

9. An apparatus for the purpose described comprising an elongated container open at one end and interiorly divided into two compartments communicating at their inner ends, a series of partition plates extending radially inward from one half of the peripheral wall of one of the compartments and throughout the length of said compartment, a closure for said open end, and means for supporting the container to rotate about a horizontal, transverse, axis.

10. An apparatus for the purpose described comprising an elongated casing open at one end and interiorly divided into two compartments communicating at their inner ends, means forming a plurality of pockets on a portion of the peripheral wall of each compartment, the pockets in one compartment being at the opposite side of a plane extending longitudinally through the container from the pockets in the other compartment, a closure for the open end of the container, and means for supporting the container to rotate about a horizontal, transverse, axis.

11. An apparatus for the purpose described comprising an elongated casing open at one end and interiorly divided into two compartments communicating at their inner ends, a series of partition plates extending throughout the length of each wall of each compartment and projecting inward from a portion of the peripheral wall of the compartment, the partitions in one compartment being at the opposite side of a plane extending longitudinally through the container from the partitions in the other compartment, a closure for the end opening of the container, and means for supporting the container to rotate about a horizontal, transverse, axis.

12. An apparatus for the purpose described comprising an elongated casing open at one end and interiorly divided into two compartments tapering toward their inner ends and communicating at the inner ends, a plurality of peripheral pockets extending throughout the length of each of said compartments, the pockets in one compartment being arranged at the opposite side of a plane extending longitudinally through the container from the pockets in the other compartment, a closure for the open end of the container, and means for supporting the container to rotate about a horizontal, transverse, axis.

13. An apparatus for the purpose described comprising an elongated casing open at both ends and divided into two compartments by an imperforate partition surrounding a central opening connecting the compartments, closures for the ends of the casing, and means for supporting the casing to rotate about a horizontal, transverse, axis.

14. An apparatus for the purpose described comprising an elongated casing open at both ends and interiorly divided into two compartments that communicate at their inner ends through a central opening, the peripheral wall of each compartment tapering toward said central opening and the adjacent end of the casing, closures for the ends of the casing, and means for supporting the casing to rotate about a horizontal, transverse, axis.

In testimony whereof I have hereunto set my hand.

ANGUS D. MacLELLAN.